June 23, 1970  B. T. G. BISHOP  3,516,547
FILTER CLEANING MEANS
Filed Feb. 8, 1968  2 Sheets-Sheet 1

Inventor
Basil Thomas George Bishop
By Cushman, Darby & Cushman
Attorneys

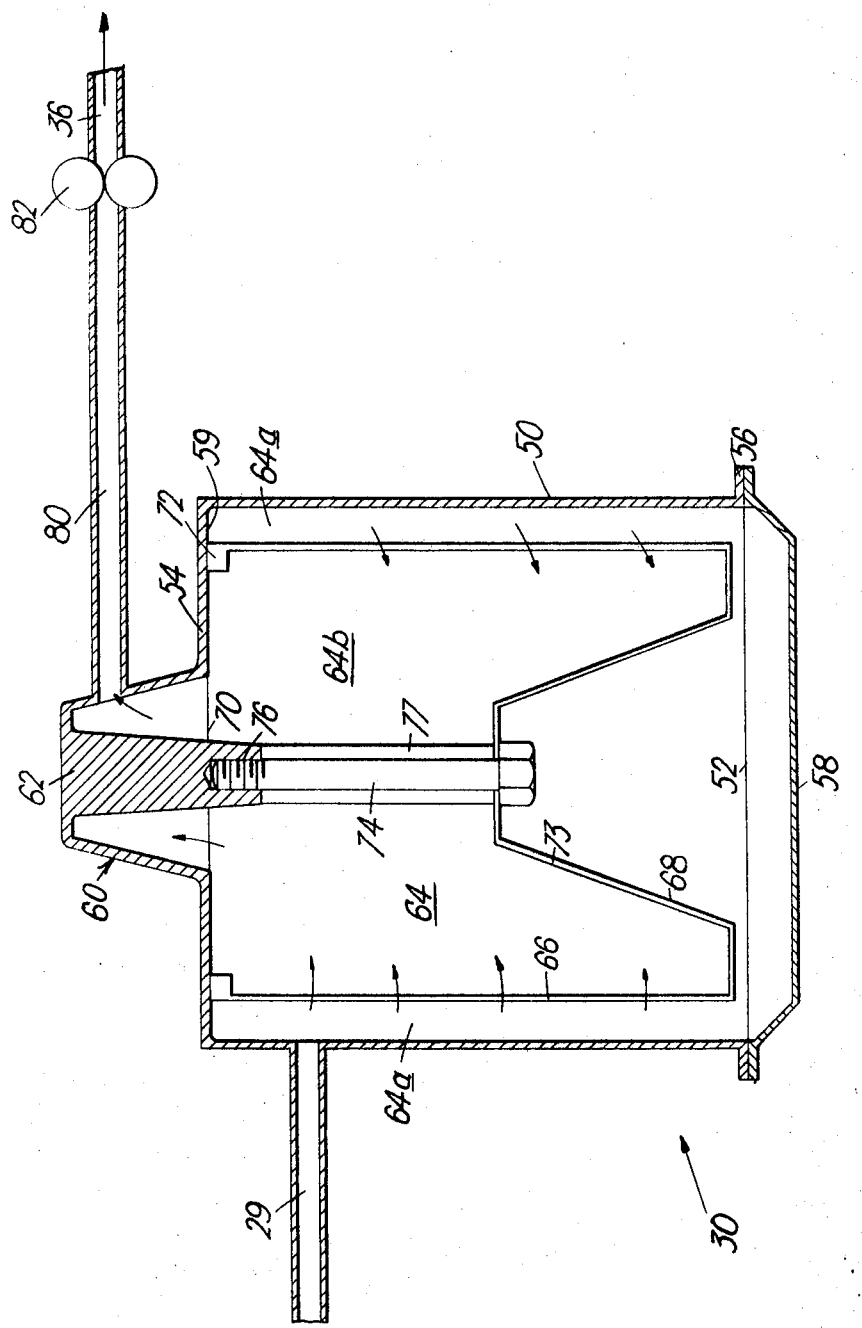

United States Patent Office 3,516,547
Patented June 23, 1970

3,516,547
FILTER CLEANING MEANS
Basil T. G. Bishop, Mickleover, England, assignor to Rolls-Royce Limited, Derby, England, a British company
Filed Feb. 8, 1968, Ser. No. 704,041
Claims priority, application Great Britain, Mar. 1, 1967, 9,592/67
Int. Cl. B01d 29/38
U.S. Cl. 210—304   5 Claims

ABSTRACT OF THE DISCLOSURE

Filtering apparatus in which a gear pump is connected to receive filtered liquid from a filter element, the gear pump having teeth which are designed to produce pressure pulses in the filtered liquid, which pressure pulses pass upstream in the filtered liquid and through the filter element so as to dislodge debris and other foreign matter adhering to the upstream side of the filter element.

---

Figure 1:
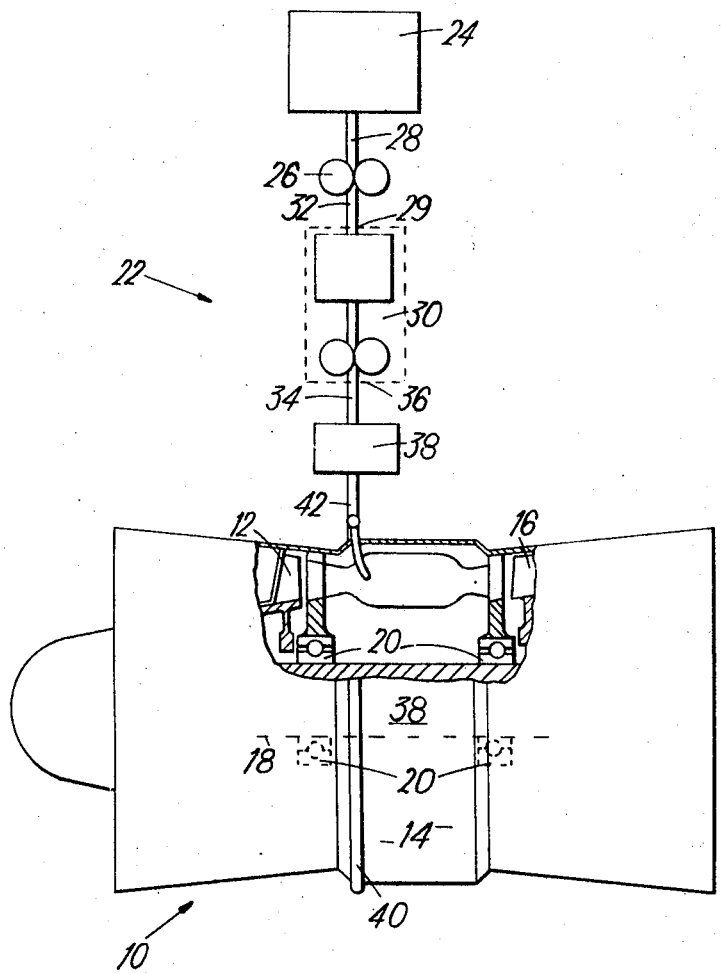

This invention relates to apparatus for filtering liquids and is particularly, but not exclusively, concerned with apparatus for filtering fuel for use in a fuel supply system of a gas turbine engine.

According to the present invention, apparatus for filtering liquids comprises a filter element adapted to be supplied with a liquid to be filtered and pressure pulse generator means connected to receive filtered liquid from the filter element, the arrangement being such that, in operation, the generator means produces pressure pulses in the filtered liquid, which pulses pass in an upstream direction through the filter element so as to dislodge debris or other foreign matter therefrom.

The filter element may comprise a hollow member having a substantially cylindrical wall composed of a filter material and be arranged for the passage of liquid from the exterior to the interior of the member.

Preferably the filter element is adapted to be supplied with the liquid to be filtered in such a manner that, in operation, the liquid flows substantially tangentially of the wall before passing therethrough.

In a preferred embodiment of the invention, the pressure pulse generator means comprises a gear pump, gear teeth of which are so designed that each time a pair of teeth mesh in the filtered liquid a pressure pulse is produced.

The invention also comprises a fuel supply system provided with apparatus for filtering liquids as set forth above, and a gas turbine engine provided with such a fuel supply system.

The invention will now be particularly described, by way of example only, with reference to the accompanying drawings, in which:

FIG. 1 is a diagrammatic part-section of a gas turbine engine having a fuel supply system provided with filtering apparatus in accordance with the invention; and FIG. 2 is a diagrammatic sectional elevation of the filtering apparatus of FIG. 1.

In FIG. 1 there is shown a gas turbine engine 10, having, in flow series, a compressor 12, combustion equipment 14 and a turbine 16. The turbine 16 is drivingly connected to the compressor 12 by a shaft 18, which is supported for rotation in bearings 20.

The gas turbine engine 10 is provided with a fuel supply system 22 which comprises a fuel tank 24 connected to the inlet of a gear pump 26 by a supply conduit 28. The outlet of gear pump 26 is connected to an inlet 29 of filtering apparatus 30 by a conduit 32. A further conduit 34 connects an outlet 36 of the filtering apparatus 30 to the inlet of a fuel supply control unit 38, the outlet of which is in turn connected to a manifold 40 surrounding the combustion equipment 14 by a conduit 42.

In operation, fuel is pumped from the fuel tank 24 to the filtering apparatus 30 by the gear pump 26. Filtered fuel passes through the conduit 34 into the fuel supply control unit 38, where the fuel flow is metered by a pilot's lever (not shown) in accordance with one or more engine variables, and thence to the manifold 40 and the combustion equipment 14.

The filtering apparatus 30, shown in more detail in FIG. 2, comprises a substantially cylindrical casing 50 having an open lower end 52 and a closed upper end 54. Projecting radially outwardly from the lower end 52 of the casing 50 is a circumferential flange 56. A sump 58 is secured in sealing engagement with the flange 56 by means not shown, thus closing the lower end 52 of the casing 50.

The closed upper end 54 of the casing 50 comprises a radially outer flat annular portion 59 and an axially outwardly projecting frusto-conical central portion 60 from the centre of which a pillar 62 extends axially into the interior 64 of the casing 50.

Mounted coaxially within the casing 50 is a substantially cylindrical filter element 66 having a closed lower end 68 and an open upper end 70 which is provided with a sealing rim 72. The filter element 66 is of larger diameter than the projecting portion 60 of the casing 50 so that the sealing rim 72 abuts the flat annular portion 59, and may be made from any suitable material, for example, wire mesh or wire gauze. The closed lower end 68 of the filter element 66 has an axially inwardly projecting frusto-conical portion 73, through which a bolt 74 projects axially into the filter element 66. The bolt 74 is provided with a coaxial spacer 77 and cooperates with an internally threaded recess 76 in the pillar 62, thus securing the filter element 66 under sufficient axial compression to hold the sealing rim 72 in sealing engagement with the closed upper end 54 of the casing 50.

The inlet 29 of the filtering apparatus 30 communicates with a space 64a in the interior 64 of the casing 50, and is shown radially disposed with respect to the casing 50; however, if desired, the inlet 29 may be substantially tangentially disposed with respect to the casing 50.

A conduit 80 is connected to the projecting portion 60 of the casing 50, and communicates between a space 64b in the interior of the casing 50 and a gear pump 82. The gear pump 82 communicates with the outlet 36 of the filtering apparatus 30. It is well known to those skilled in the art that, unless great care is exercised in designing the tooth profiles of the meshing gears of gear pumps, said gear pumps will produce upstream pressure pulses. In the preferred embodiment the shape of a given pair of meshing teeth in the gear pump 82 are so designed that fuel will be trapped between said meshing teeth as they begin to mesh, and as the gears further rotate, a portion of the trapped fuel will form upstream pressure pulses. The shapes of said teeth may take any of a variety of well-known configurations which will produce the desired result, and it is to be noted that when the teeth of a gear pump are badly designed for proper operation the result desired herein will be produced.

In operation, fuel enters the filtering apparatus 30 through the inlet 29, and passes into the space 64a in the casing 50. The fuel tends to flow circumferentially round the filter element 66 (such flow being further encouraged by a tangentially disposed inlet), before passing through the filter element 66, which removes debris and foreign matter from the fuel, into the space 64b.

Filtered fuel then passes into the projecting portion 60 of the casing 50 and through the conduit 80 to the gear pump 82. Gear teeth (not shown) of the gear pump 82 are so designed according to known principles so that the meshing teeth are misshapen for proper pump operation that each time a pair of teeth begin to mesh fuel supplied thereto is trapped therebetween. As the teeth become further enmeshed some of the trapped fuel is ejected in an upstream direction, thus producing a pressure pulse in the fuel upstream of the gear pump 82, the remainder of the trapped fuel being pumped to the outlet of the gear pump 82. The magnitude of the pulses produced by the gear pump 82 can be varied by suitable modification of the design of the gear teeth so that a greater amount of fuel is trapped therebetween, while the pulse frequency can be varied by varying the speed at which the gear pump 82 is driven. The optimum pulse magnitude and frequency for a given filter configuration can be determined by experiment.

The pressure pulses so produced pass upstream in the fuel through the conduit 80 into the space 64b in the casing 50, and thence through the filter element 66. Any debris or foreign matter adhering to the outside of filter element 66 is dislodged by the pressure pulses, the action of the pulses being augmented by the "washing action" produced by the circumferential flow of fuel round the filter element 66. Dislodged debris or foreign matter sinks through the fuel and settles in the sump 58.

Thus, clogging of the filter element 66 is substantially retarded, and the length of time between filter element changes is considerably increased.

It will be appreciated that the gear pump 82 can be replaced by any suitable generator of pressure pulses.

It will further be appreciated that although the filtering apparatus is described with reference to its use in the fuel supply system of a gas turbine engine, it is applicable to many types of fuel supply system. With suitable modification, the filtering apparatus of the present invention could also be applied to fluid flow systems other than fuel supply systems, for example, lubrication systems.

I claim:
1. Apparatus for filtering liquids comprising a housing adapted to be supplied with a pumped liquid to be filtered, a filter element placed within said housing, and a pump means connected downstream of said filter element for pumping said liquid therefrom downstream, said pump means including a pressure source for generating and transmitting a pressure pulse upstream of said pump means to said filter element thereby dislodging debris from said filter element.

2. The apparatus defined in claim 1 wherein said pump means is a gear pump having meshing gears with tooth profiles of a shape which will trap said liquid therebetween, said tooth profile shapes being such that further rotation of said gears will produce upstream pressure pulses of said liquid.

3. Apparatus as claimed in claim 1, wherein the filter element comprises a hollow member having a substantially cylindrical wall composed of a filter material and is arranged for the passage of liquid from the exterior to the interior of the member.

4. Apparatus as claimed in claim 3, wherein the housing is adapted to be supplied with the liquid to be filtered in such a manner that, in operation, the liquid flows substantially tangentially of the wall of the filter element before passing therethrough.

5. A fuel system comprising a fuel source, outlet means communicating said fuel system with a means utilizing said fuel, a first pump means for pumping fuel from said source downstream to said outlet means and filter means interposed between said first pump means and said outlet means, said filter means comprising a housing adapted to receive fuel pumped from said first pump, a filter element placed within said housing and a second pump means connected downstream of said filter element for pumping said fuel therefrom, said pump means including a pressure source for generating and transmitting a pressure pulse upstream of said pump means to said filter element thereby dislodging debris from said filter outlet.

References Cited

UNITED STATES PATENTS

| 2,362,750 | 11/1944 | Hayward | 210—411 X |
| 3,019,903 | 2/1962 | Daane | 210—411 X |
| 3,389,797 | 6/1968 | Giardini | 210—412 X |

FOREIGN PATENTS

| 712,433 | 10/1941 | Germany. |
| 589,816 | 2/1948 | Great Britain. |
| 350,762 | 7/1937 | Italy. |

REUBEN FRIEDMAN, Primary Examiner

F. A. SPEAR, JR., Assistant Examiner

U.S. Cl. X.R.

210—408, 412, 416